(12) United States Patent
Henderson et al.

(10) Patent No.: US 9,042,878 B2
(45) Date of Patent: May 26, 2015

(54) SYSTEM AND METHOD FOR ADAPTING AN ELECTRONIC DEVICE FOR DIFFERENT DESIRED PERSONA

(71) Applicants: Winston Henderson, Boston, MA (US); Wayne M. Kennard, Lexington, MA (US)

(72) Inventors: Winston Henderson, Boston, MA (US); Wayne M. Kennard, Lexington, MA (US)

( * ) Notice: Subject to any disclaimer, the term of this patent is extended or adjusted under 35 U.S.C. 154(b) by 0 days.

(21) Appl. No.: 13/986,141

(22) Filed: Apr. 4, 2013

(65) Prior Publication Data

US 2014/0302835 A1   Oct. 9, 2014

(51) Int. Cl.
*H04W 4/00* (2009.01)
*H04W 72/04* (2009.01)
*H04W 68/00* (2009.01)
*H04W 8/18* (2009.01)
*H04L 29/08* (2006.01)
*G06F 3/048* (2013.01)
*H04M 1/725* (2006.01)

(52) U.S. Cl.
CPC ............ *H04W 4/001* (2013.01); *H04L 67/306* (2013.01); *G06F 3/048* (2013.01); *H04M 1/72563* (2013.01)

(58) Field of Classification Search
CPC ... H04W 4/24; H04L 65/1016; H04L 67/141; H04L 67/306; H04L 12/581; H04L 51/04; H04L 67/02; H04L 67/16; H04L 67/24; H04L 67/30; H04L 69/329; H04L 41/00; G06Q 10/10; G06Q 30/0255; G06Q 30/0269; G06Q 10/105; G06Q 30/00; G06Q 50/00
USPC .................. 455/406, 558, 418, 419; 709/200; 713/100; 715/810; 705/14.53, 14.55, 705/14.66
See application file for complete search history.

(56) References Cited

U.S. PATENT DOCUMENTS

| | | | |
|---|---|---|---|
| 2003/0107606 A1* | 6/2003 | Capps et al. .................. | 345/810 |
| 2005/0060532 A1* | 3/2005 | Dorenbosch et al. ......... | 713/100 |
| 2011/0053574 A1 | 3/2011 | Rice | |
| 2011/0124315 A1* | 5/2011 | LaFreniere et al. ........... | 455/410 |
| 2012/0254225 A1 | 10/2012 | Carter et al. | |
| 2014/0220932 A1* | 8/2014 | Ring et al. .................... | 455/406 |

* cited by examiner

*Primary Examiner* — Inder Mehra (57) ABSTRACT

A system and method are described for automatically or manually adapting the user interface of a mobile electronic device ("MED") for a desired persona of the system user. This will permit the system user to provide a desired personal image to the outside world. The ability of a system user to adapt the MED for a system user's persona will include the changing the user interface consistent with the persona the system user desires to represent internally and externally. This will also permit the system user to change the external connections of his/her MED consistent with that persona, which will remain the active persona until the system user decides to change the persona.

10 Claims, 11 Drawing Sheets

SYSTEM AND METHOD FOR ADAPTING AN ELECTRONIC DEVICE FOR DIFFERENT DESIRED PERSONA

FIELD OF THE INVENTION

The present invention relates to systems and methods for configuring electronic devices for different modes of operation related to location or representation of personal image. More specifically, the present invention relates to systems and methods for configuring electronic devices, such as a smart phone or mobile phone or smart tablet device, so that the interface as presented to the system user will change based on location or representation of the user's personal image.

BACKGROUND OF THE INVENTION

There is an increased number of individuals globally that use mobile electronic devices, such as smart phones, smart tablet devices, and the like (collectively, "MEDs"), for the communications with other individuals and for carrying out business transactions. Although, the current MED technology provides the ability to select and download various types of applications for use on a specific user MED, the basic user interface remains the same.

In view of many MED users operating in multiple system environments in every given day, for example, a single person in a social environment, a person in a work environment, a person as a shopper, a person as a parent, the MED is not adaptable to specifically provide an interface for the system user that would accommodate these different personas automatically or manually. That is, if each of the different environments in which a system user experiences in any given day are thought of as requiring a different avatar, the MED is not adapted to remain consistent with that avatar. The adapting of the user interface would include, but not be limited to, the contextual content of the interface and interface connections external to the MED.

It is highly desirable to be able to automatically or manually configure a MED interface and the MED to adapt to a desired system user persona consistent with the personal image that such system user desires at any given time.

SUMMARY OF THE INVENTION

The present invention is directed to a system and method for automatically or manually adapting the user interface of a MED and the MED for a desired persona of the system user at a given point in time consistent with a desired representation of the user's personal image.

The ability of a system user to adapt the MED for a system user's persona will include changing the user interface consistent with the persona the system user wishes to represent internally and externally, changing the external connections of the MED consistent with that persona, and operating the MED according to that persona until the persona is changed.

According to the present invention, the application for providing the ability of the system user to change the operating persona of the MED may be a downloadable application that will be either stored on the MED or an application that accesses a remote system that will provide the necessary operating subsystems, for example, through a cloud-based application.

When the application is downloaded and the icon for the application of the present invention is first activated, the system user will be prompted to set up an account under which the personas that are created will stored. The account number will be unique to each system user and it may be protected by known security mechanisms.

The present invention permits either automatic or manual activation of the persona-based application. If activation is manual, it may be based on activation of an icon on MED display screen, selection on a drop-down menu, activation of a manual switch, voice activation, or other actions that are carried out by the system user.

If activation is automatic, it may be based on the MED being exposed to the electronic field that will cause automatic activation of the persona-based application or it may be based on a particular time and date. For example, when a system user enters their home or apartment you could activate a home mode persona as a parent by providing an activation device at the thresholds for the home when entering and one for changing it to a different persona when leaving. This same type of automatic activation could be provided for business applications such as department stores such that when the system user enters department store, activation of the shopper persona for that business could be activated on the MED providing desired information for the system user for shopping in that store that day.

When a particular persona is activated on the MED, the display screen of the MED will be changed to provide a presentation screen consistent with the persona automatically based on settings input by the system user whether display screen will be automatically selected or manually. The content of the display screen for a particular persona will have the functioning preferences selected by the system user. Accordingly, a first persona may provide a first set of downloaded apps for display screen consistent with that first persona, while a second persona may provide a second set of downloaded apps for this display screen consistent with the second persona. As such, the system user will be able to operate in essentially in two different modes of operation based on the selected persona.

Until a system user selects a particular persona, the MED will operate in a master mode will be consistent with a normal operating mode of an MED. It is only after the system user selects to operate in a persona mode, that the MED persona can be automatically changed or the system user can manage select the various persona settings program by the system user.

The present invention will be described in greater detail in the remainder the application referring to the drawings.

DETAILED DESCRIPTION OF THE PRESENT INVENTION

The present invention is a system and method for automatically or manually adapting the user interface of a mobile electronic device ("MED") and the MED for a desired persona of the system user. This will permit the system user to provide a desired personal image. The ability of a system user to adapt the MED for different system user personas will include changing the user interface and the MED consistent with the persona the system user desires to represent internally and externally. This will also permit the system user to change the external connections of his/her MED consistent with that persona, which will remain the active persona until the system user decides to change the persona.

According to the present invention, the application for providing the ability of the system user to change the operating persona of the MED may be a downloadable application that will be either stored on the MED or an application that the MED accesses a remote system that will provide the necessary operating subsystems, for example, through a cloud-based application. Further, the present invention permits either automatic or manual activation of the persona-based application.

When the application is downloaded and the icon for the application of the present invention is first activated, the system user will be prompted to set up an account under which the personas that are created will stored. The account number will be unique to each system user and it may be protected by known security mechanisms.

If activation is manual, it may be based on activation of an icon on MED display screen, selection on a drop-down menu, activation of a manual switch, voice activation, or other actions that are carried out by the system user. If activation is automatic, it may be based on the MED being exposed to the electronic field that will cause automatic activation of the persona-based application or it may be based on a predetermined time and date.

Figure 1:
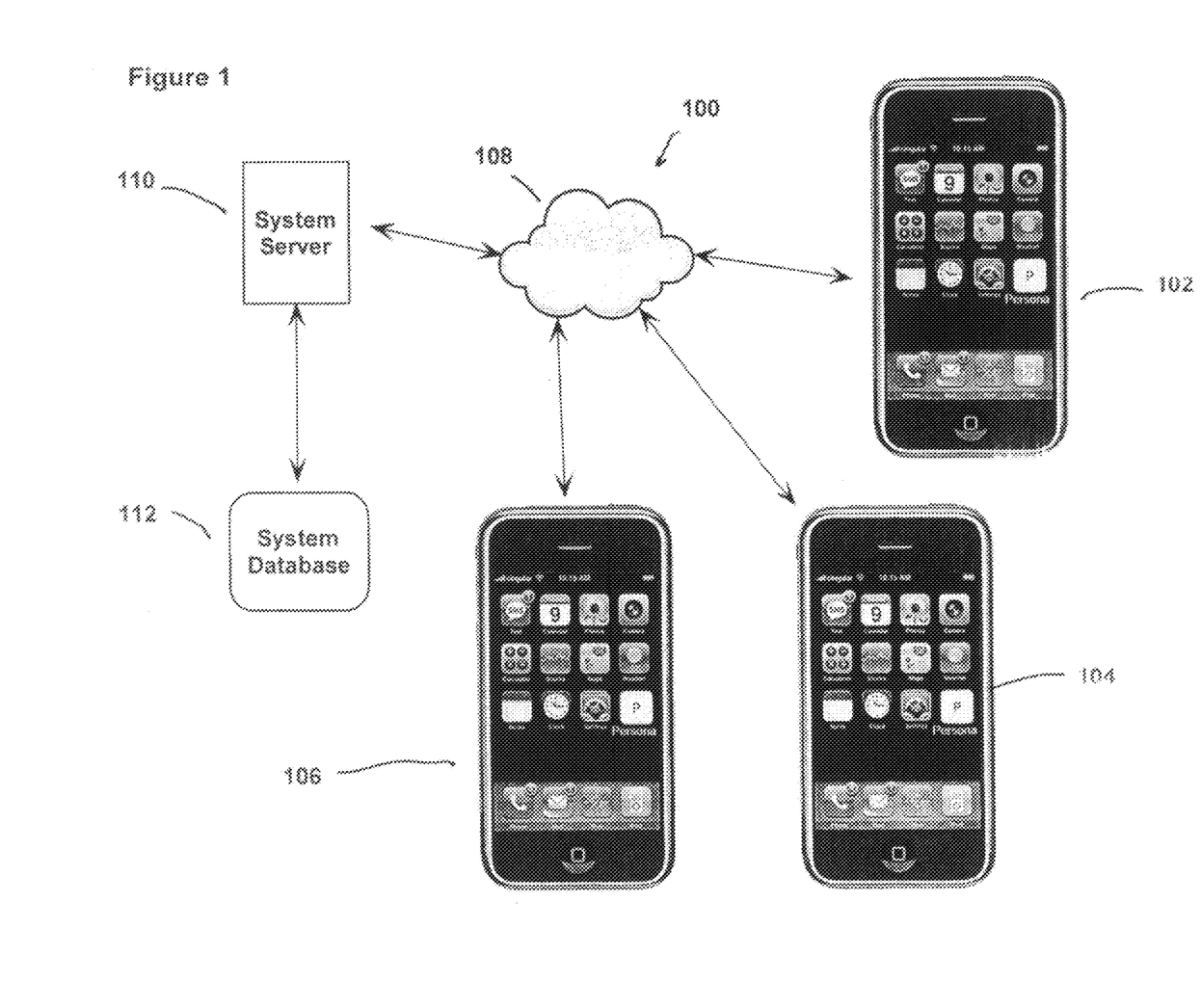
FIG. 1 shows a representative system for carrying out the method of the present invention, which preferably automatically or manually adapts the user interface of a MED and MED for a desired persona of the system user at a given point in time consistent with a desired representation of the user's personal image.

Referring to FIG. 1, generally at 100, the system of the present invention is shown. According to the present invention, MEDs 102, 104, and 106, preferably will have a mobile application downloaded and stored on it that implements the method of the present invention for automatically or manually adapting the user interface of the MED and the MED itself for a desired persona of the system user at a given point in time consistent with a desired representation of the user's personal image. MEDs 102, 104, and 106 include at least a processor, input and output subsystems, and memory for operating the MEDs for carrying out the present invention It is understood that MEDs 102, 104, and 106 do not have to download and store the mobile application of the present invention but may access an application in a cloud that will permit such MEDs to carry out the method of the present invention for automatically or manually adapting the user interface of a MED for a desired persona of the system user at a given point in time consistent with a desired representation of the user's personal image.

Again referring to FIG. 1, MEDs 102, 104, and 106 may wirelessly connect to the Internet 108. However, it is understood other similar structures, for example, the World Wide Web ("WWW"), could be used and still be within the scope of the present invention.

FIG. 1 also shows system server 110 to which each of the MEDs connect for carrying out the method of the present invention. System server 110 has a processor, input and output subsystems, and memory for operating with the MEDs for carrying out system and method of the present invention. System server 110 connects to system database 112. System database 112 is for storing persona information for each system user as we discussed subsequently with respect to the remainder the Figures.

Figure 2:
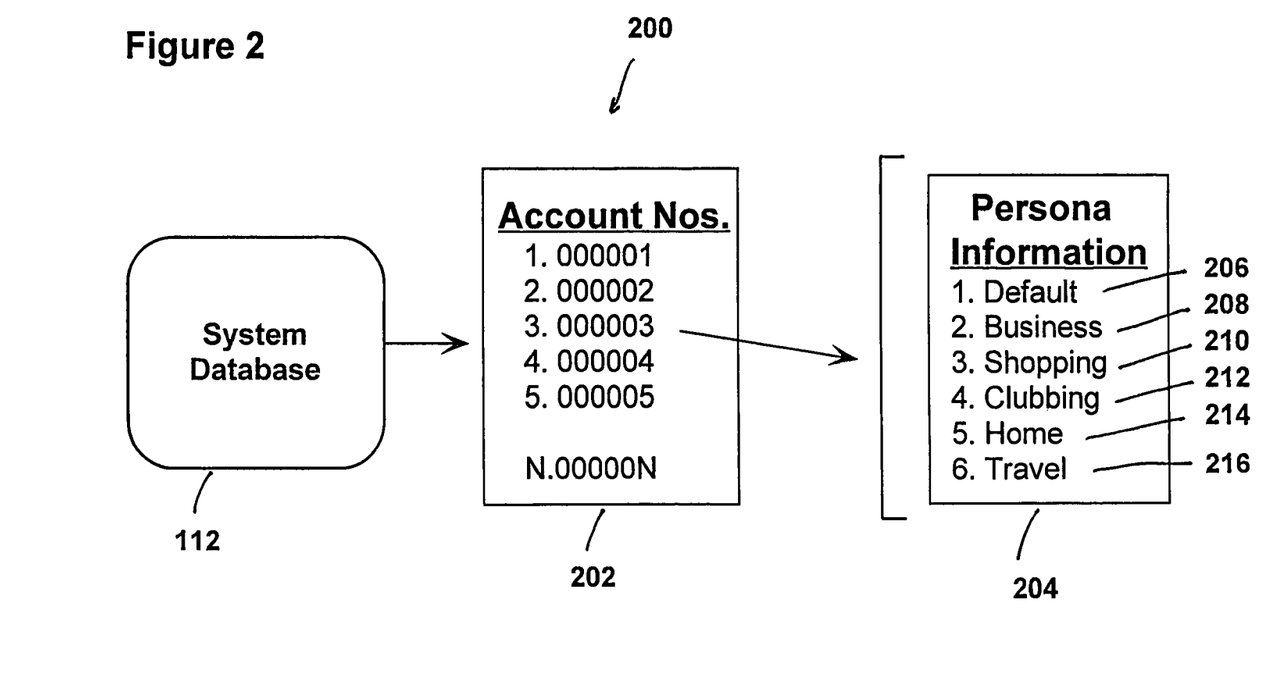
FIG. 2 shows a representative system database and files account number files and information associated with each account number file that is stored in the system database.

FIG. 2, generally at 200, shows system database 112 from the FIG. 1 and the representative accounts and representative persona information applicable to one account. Again referring to FIG. 2, at 202, it shows that system database 112 stores information about system users based on account numbers. For example, MED 102 may be assigned account number 000001, MED 104 may be assigned account number 000002, and MED 106 may be assigned account number 000003.

It is understood by a person of ordinary skill in the art that system database 112 may store account information for 1-N system users up to the capacity of the system database. It is also understood by a person of ordinary skill in the art that account numbers may be of any form/format as long as system server 110 and system database 112 can track such account numbers to the applicable MED. Further, the account numbers may be in encrypted or unencrypted form and still be within the scope of the present invention.

Database 112 or another database of the system (not shown) that is electronically connected to system server 110 may contain an apps store from which 1-N system users may select apps to associate with their particular personas. This app store will include both free and paid apps. Further, the app store may have apps categorized by type, ethnicity, culture, geography, or other methods. It is understood that the categories here are only representative and other categorizations of app in the store may be used and still within the scope of the present invention.

Referring to FIG. 2, system user who owns or is authorized to use MED 106 and has been assigned account number 000003 by system server 110, when his/her account was set up, set up the six persona information sets that are shown. This is meant just to be representative and a limitation on the present invention. As such, there are six persona information sets shown but a person of ordinary skill in the art would understand that more or less than six may be set up by the system user and this would still be within the scope of the present invention.

Referring to the persona information menu at 204, this menu would appear on MED 106 in a method to be described subsequently but the persona information will be appropriately stored on system database 112 associated with account number 000003 for MED 106.

Figure 3:
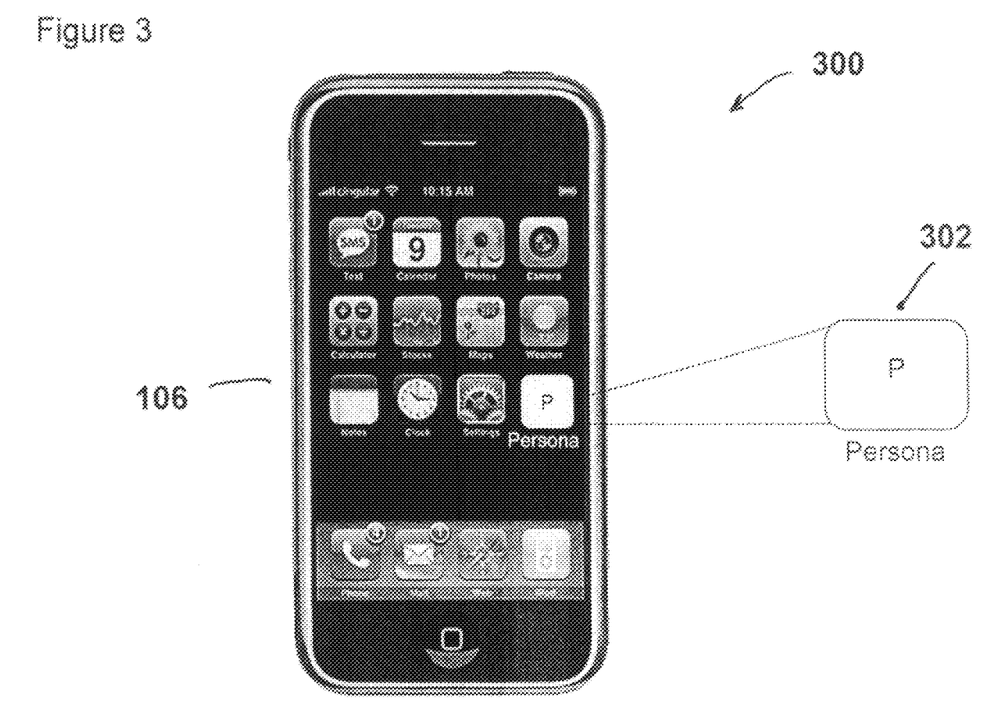
FIG. 3 shows a MED interactive touch screen that includes an icon for activating the method of the present invention for automatically or manually adapting the user interface of a MED and MED for a desired persona of the system user at a given point in time consistent with a desired representation of the user's personal image.

Referring to FIG. 3, generally at 300, an enlarged view of representative MED 106 is shown. There are a number of icons shown on the face of MED 106 and one of the icons is marked with a "P" to indicate that this is the persona icon of the present invention. More specifically, the persona icon is shown at 302 in FIG. 3. The "P" icon will be present on each persona screen, which will permit the system user too change his/her persona at any time.

Referring to FIGS. 4-11, the series of drop-down menus and selection options for the system user will be described that are associated with activation of the persona icon 302 as shown in FIG. 3 for adding and deleting personas, and changing the settings for existing personas.

Figure 4:
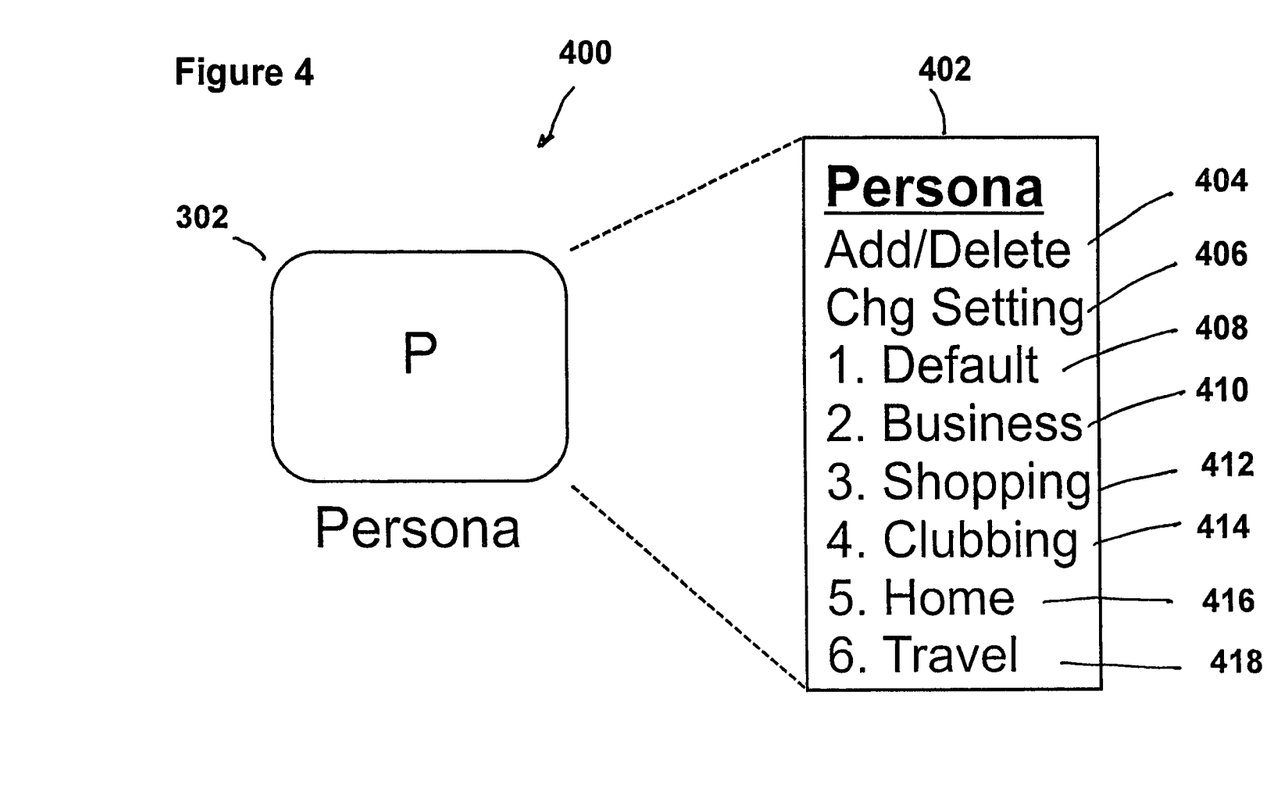
FIG. 4 shows the "Persona" menu that will be displayed on a MED when the icon for automatically or manually adapting the user interface of a MED and MED for a desired persona of the system user at a given point in time consistent with a desired representation of the user's personal image is activated.

Referring to FIG. 4, generally at 400, when persona icon 302 is activated by the system user, the drop-down "Persona" menu shown that 402 will be displayed on MED 106. Persona drop-down menu 402 is shown with eight selections: These selections include "Add/Delete" selection 404, "Chg Settings" selection 406, "Default" selection 408, "Business" selection 410, "Shopping" selection 412, "Clubbing" selection 414, "Home" selection 416, and "Travel" selection 418. Although, persona drop-down menu 402 includes eight selections, it is understood by one of ordinary skill in the art that there may be more or less than eight selections and still be within the scope of the present invention.

A system user would select "Default" 206 for setting the parameters for operating the MED for standard use with no specialized persona. The system user would select "Business" 208 when entering, for example, his or her office every day and maintaining user that icon until leaving at the end of the day. The system user may select "Shopping" 210 when shopping at a department store or other store, for example, for clothes or furniture. The system user may select "Clubbing" 212 when going out in the evening and night clubs. Further, the system user may select "Home" 214 during the time he/she is at home. Lastly, the system user may select "Travel" 216 when traveling on pleasure or for business. It is understood, that the selection of the persona on menu 204 may be done manually on the MED or it could be done automatically through the use of a transponder at the threshold of locations the system user enters and leaves or according to predetermined date and times. It is contemplated that the system and method of the present invention would permit a selectable icon on the MED that would permit the system user to choose manual or automatic operation.

Figure 5:
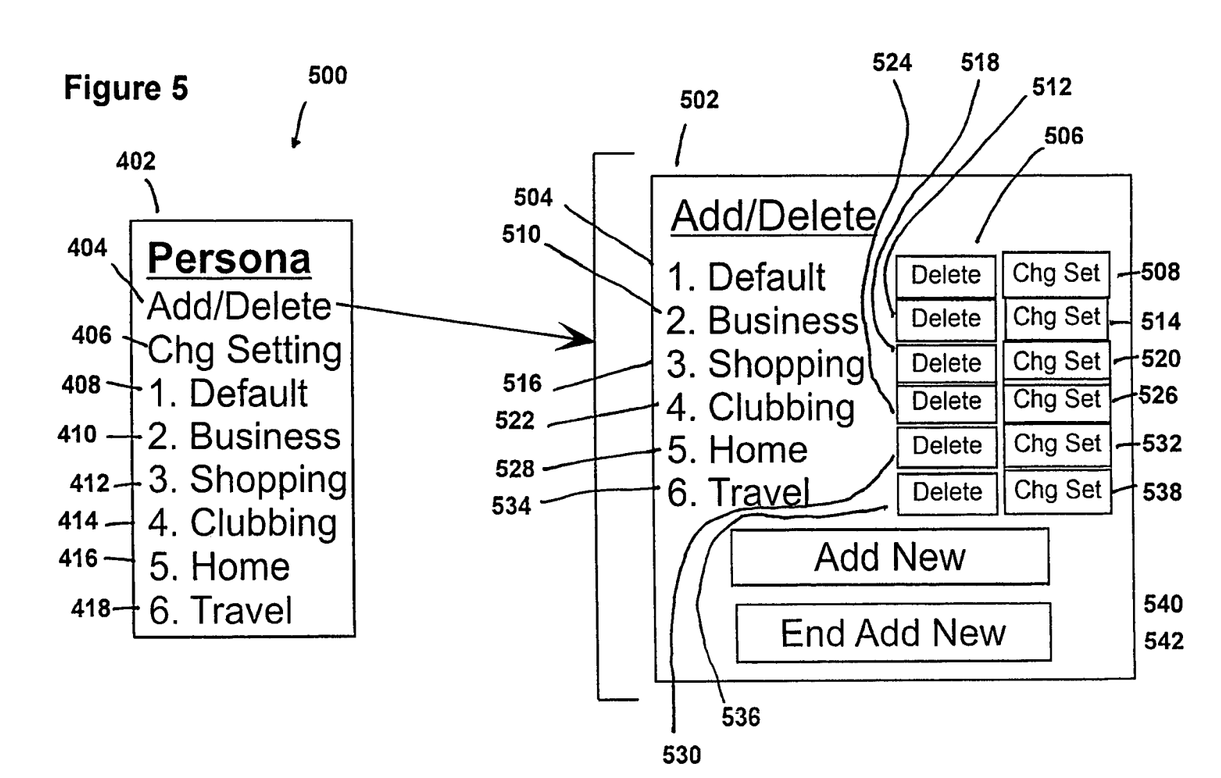
FIG. 5 shows the "Add/Delete" screen display that will be displayed when the "Add/Delete" selection is selected on the "Persona" menu.

Referring to FIG. 5, generally at 500, when "Add/Delete" selection 404 is selected on Persona drop-down menu 402, "Add/Delete" drop-down menu 502 is displayed on the display screen of MED 106. Add/Delete drop-down menu 502 displays "Default" 504 along with associated Delete button 506 and Chg Set button 508, "Business" 510 along with associated Delete button 512 and Chg Set button 514, "Shopping" 516 along with associated Delete button 518 and Chg Set button 520, "Clubbing" 522 along with associated Delete button 524 and Chg Set button 526, "Home" selection 528 along with associated Delete button 530 and Chg Set button 532, and "Travel" 534 along with associated Delete button 536 and Chg Set button 538.

The "Delete" button that is associated with each of the personas shown at 504, 510, 516, 522, 528, and 534 would be selected if the system user desired to delete that persona from the system and further use. This would cause that persona to be deleted from MED 106 and from system date database 112. After, deleting a persona, the system user would activate "End ADD New" button 542 that would return the system user to previous display screen on MED 106 or the default screen. Further, the "Chg Set" button that is associated with each of the persona shown at 504, 510, 516, 522, 528, and 534 is activated if the system user desired to change the settings for a particular persona. This will cause the settings for that persona to be changed on the MED and system server 112 so that when the system user desires to use that persona it will be provided with such new settings.

Again referring to Add/Delete drop-down menu 502, it also includes "Add New" button 540 and "End Add New" button 542. The activation of these buttons will be described in further detail with respect to FIGS. 6 and 7.

Figure 6:
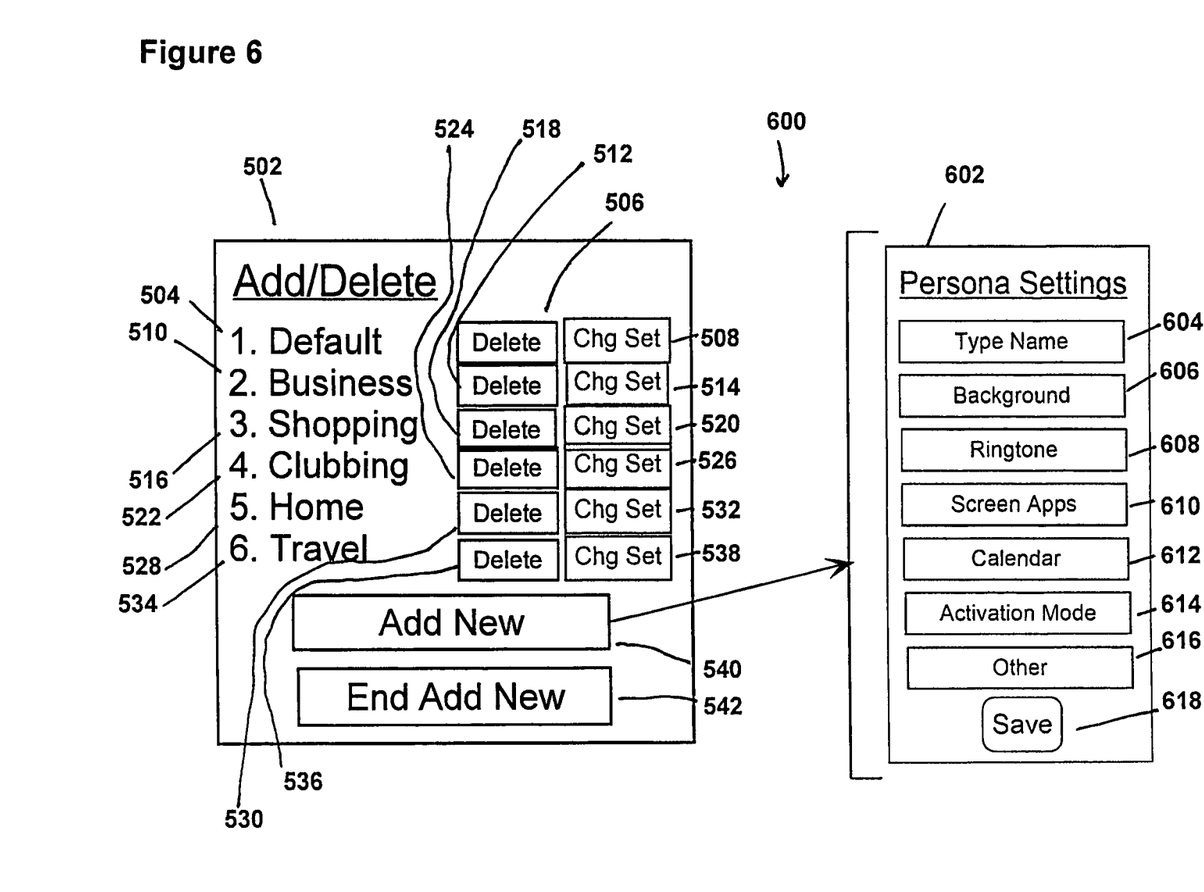
FIG. 6 shows the "Persona Settings" menu that will be displayed when the "Add New" icon is selected on the "Add/Delete" screen display.

Referring to FIG. 6, generally at 600, "Add/Delete" drop-down menu 502 and "Persona Settings" drop-down menu 602 are shown. As stated previously, when "Add/Delete" drop-down menu 502 is displayed on the display screen of MED 106, "Default" 504 is displayed along with associated Delete button 506 and Chg Set button 508, "Business" 510 is displayed along with associated Delete button 512 and Chg Set button 514, "Shopping" 516 is displayed along with associated Delete button 518 and Chg Set button 520, "Clubbing" 522 is displayed along with associated Delete button 524 and Chg Set button 526, "Home" 528 is displayed along with associated Delete button 530 and Chg Set button 532, and "Travel" 534 is displayed along with associated Delete button 536 and Chg Set button 538. Add/Delete drop-down menu 502 also displays "Add New" button 540 and "End Add New" button 542.

When "Add New" button 540 is activated, it will provide the means by which a system user can add a new persona to MED 106 and sand also store it on system database 112. Upon activation of Add New button 540, "Persona Settings" drop-down menu 602 is displayed on MED 106. When "Type Name" button is activated by the system user, an area is provided on the MED 106 display where the system user can enter the name of the new persona, e.g., "Mack Daddy." Upon entering the new persona name, the system user will next activate the "Background" button 606, which will provide a number of stored backgrounds for MED 106 when this persona is selected by the system user to depict the particular persona. If none of the stored backgrounds is what the system user desires, he/she can download an appropriate background, for example, from an Internet website.

After the selection of the desired background, the system user will activate "Ringtone" button 608. Upon activation of this button, the system user will be provided a number of stored ringtones in a drop-down menu on MED 106 from which to choose for this particular persona. If the system user does not desire to use any of these a ringtones, then he/she can download an appropriate ring tone, for example, from an Internet website.

After the appropriate ringtone has been selected, the system user will activate "Screen Apps" button 610. Upon activation of the Screen Apps button, MED 106 will provide an area in which the system user can add shortcuts for all of the Screen Apps icons he/she wants displayed on MED 106. The Screen Apps icons can be displayed for the new persona in any manner desired by the system user. The apps to be displayed may be selected from app sites through the Internet or may be selected from the app store database associated with system server 110. The database that includes the app store may be database 112 or another database (not shown) that is electronically connected to the system server 110.

After the Screen Apps have been selected for the new persona, the system user will activate "Calendar" button 612. When this button is activated, the system user will be provided with a calendar and the system user can preselect specific dates and times when the new persona will be automatically activated. If the system user does not want to automatically activate the new persona at any specific date and time, he/she will not enter anything in the calendar.

Figure 7:
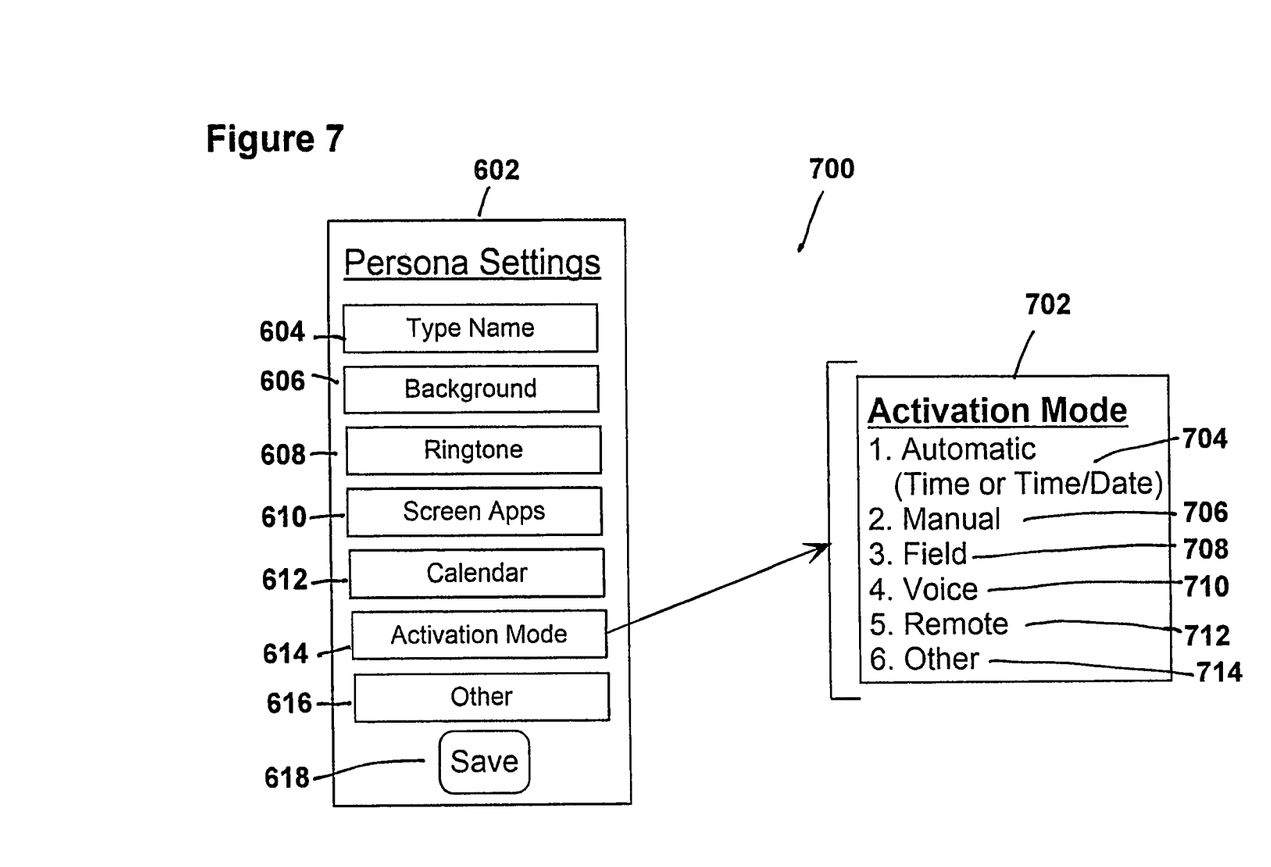
FIG. 7 show the "Activation Mode" menu that will be displayed when the "Activation Mode" icon is selected on the "Persona Settings" menu.

After selecting any specific dates and times using Calendar button 612, the system user will select "Activation Mode" button 614. Referring to FIG. 7, when the "Activation Mode" button is selected, "Activation Mode" drop-down menu 702 will be displayed on MED 106. If the system user wants the new persona to be activated automatically, he/she will select "Automatic" at 704 and, if the system user desires the persona to be automatically activated at the same time every day, he/she will enter a time when prompted. However, if the system user desires a certain time and date for activation of the new persona, he/she will enter that time and date when prompted. The selection of "Automatic" will work in conjunction with automatic activation based on times and dates that the system user has entered on the calendar for automatic activation as previously described.

If the system user wants to activate the new persona only when he/she desires, system user will select "Manual" activation at 706. This will mean that when the system user activates persona button 302 icon (FIG. 4) that system user would select the desired persona from the list that is displayed and that persona will be activated. The selected persona will remain activated until the system user chooses another persona or it is overridden by automatic activation of another persona.

If the system user selects "Field" activation at 708 for the new persona, this new persona will be activated when MED 106 passes through a particular passive or active electronic-based field, such as, at the threshold of a building, which will automatically activate the new persona. For example, if the particular business where the system user is employed has a passive or active electronic-based field at the entrances that will activate the MEDs of its employees to change these MEDs to a business persona, then that would happen each time the system user enters the building and may also cause these MEDs the change back to the "Default" persona when leaving the building.

If the system user selects the "Voice" activation at 710 for the persona, the new persona will be activated when the system user speaks the persona name into the microphone associated with MED 106. Voice activation may include the system user reciting the persona name or other word or phrases that can be used for voice activation of the new persona and still be within the scope of the present invention.

The system user may also select "Remote" activation at 712. Remote activation will permit the system user to activate the new persona on the MED using a remote device, such as a personal computer, iPad, personal digital assistant, or other smart device by connecting to the MED remotely and wirelessly via, for example, the Internet, the World Wide Web, or other similar type of system.

"Other" at 714 is provided because a person of ordinary skill in the art would understand that there may be other activation modes in addition to those shown at 704, 706, 708, 710, and 712 that could be used and still be within the scope of the present invention.

After the "Activation Mode" has been selected, system user would activate "Other" at 616. "Other" is present to indicate that there may be other settings provided for the new persona as would be understood by person of ordinary skill in the art.

The person of ordinary skilled in the art would understand there may be more or less than Persona Settings shown at 602 and still be within the scope of the present invention.

Again referring to FIG. 6, once the system user is entered all of the "Persona Settings" at 602, the system user will activate "Save" button 618. This will cause the settings to be stored on MED 106 and be stored in a system database 112 via Internet 108 and system server 110. The new persona and settings will be stored with respect to account number 000003. Referring to FIG. 2, after the new persona is saved under account number 000003 there would now be a seventh entry under persona information at 204, namely, "7. Mack Daddy" that could be selected manually or automatically by the system user.

Figure 8:
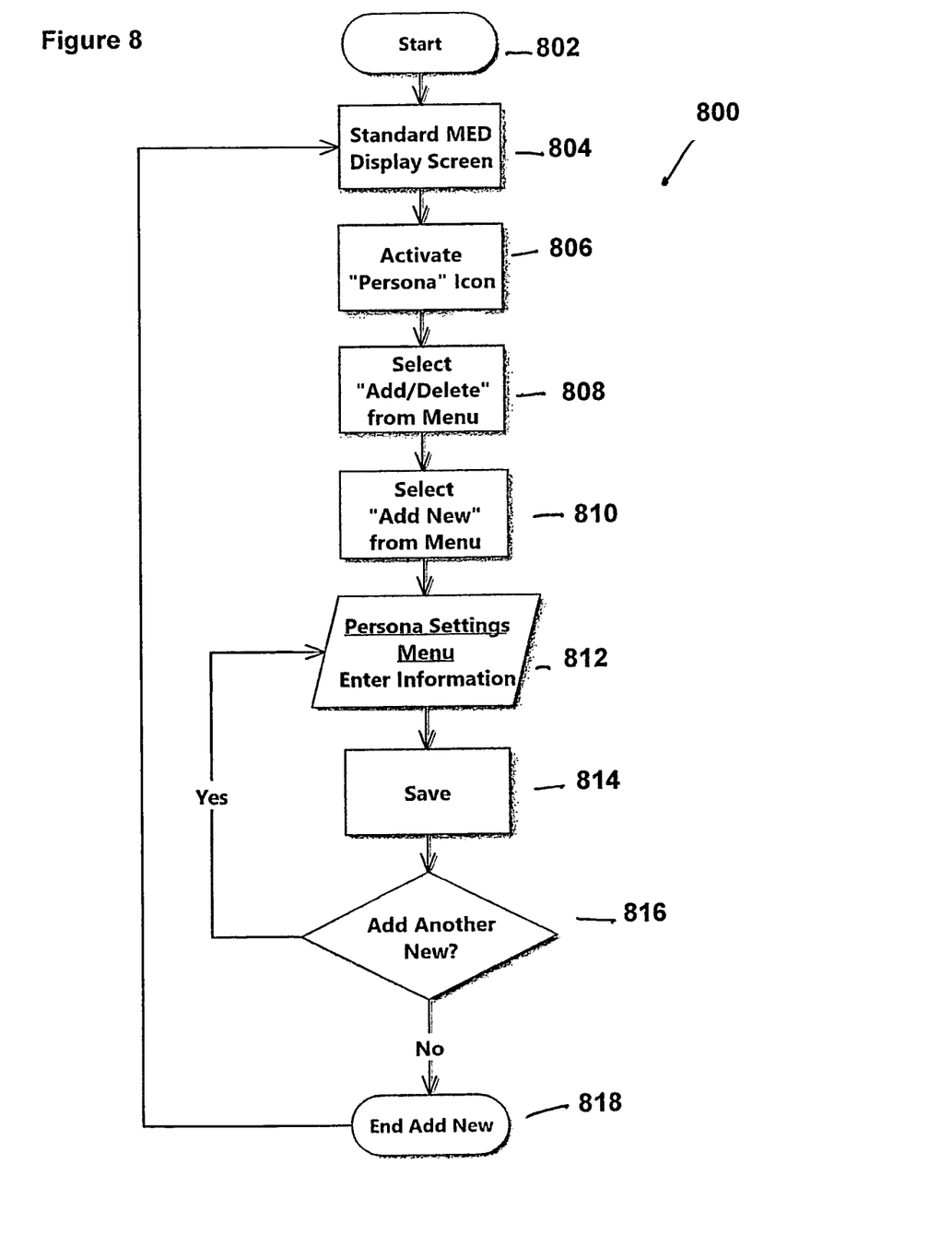
FIG. 8 shows a representative flow diagram for adding a new persona to the MED according to the system and method of the present invention.

Referring to FIG. 8, generally shown at 800, a flow diagram is shown for setting up a new persona. Start at 802 of the flow diagram is when the system user desires to add a new persona to MED 106 and store that new persona in system database 112 under that system user's account. The system user at 804 will access the MED display screen and at 806 will activate the "Persona" icon. At 808, the system user will then activate the "Add/Delete" button on the drop-down menu that is provided. At 810, the system user will then activate the "Add New" button. Next, at 812, system user will enter the "Persona Settings" information and then at 814, and then system user will save the new settings on the MED and on system server 112. At 816, the system user makes a determination whether he or she wishes to add any additional new personas. If additional new personas are to be added, then the system user will go back to 812 and add the personal settings for each additional new persona. The persona settings for each new persona will be saved on the MED and in system server 112. After all new personas have been added, the method proceeds to 818 which ends at a new personas and returns the system user to the MED display screen or the previous persona display screen. More specifically, the system user activates "End Add New" button 542 to end the add personas process.

Figure 9:
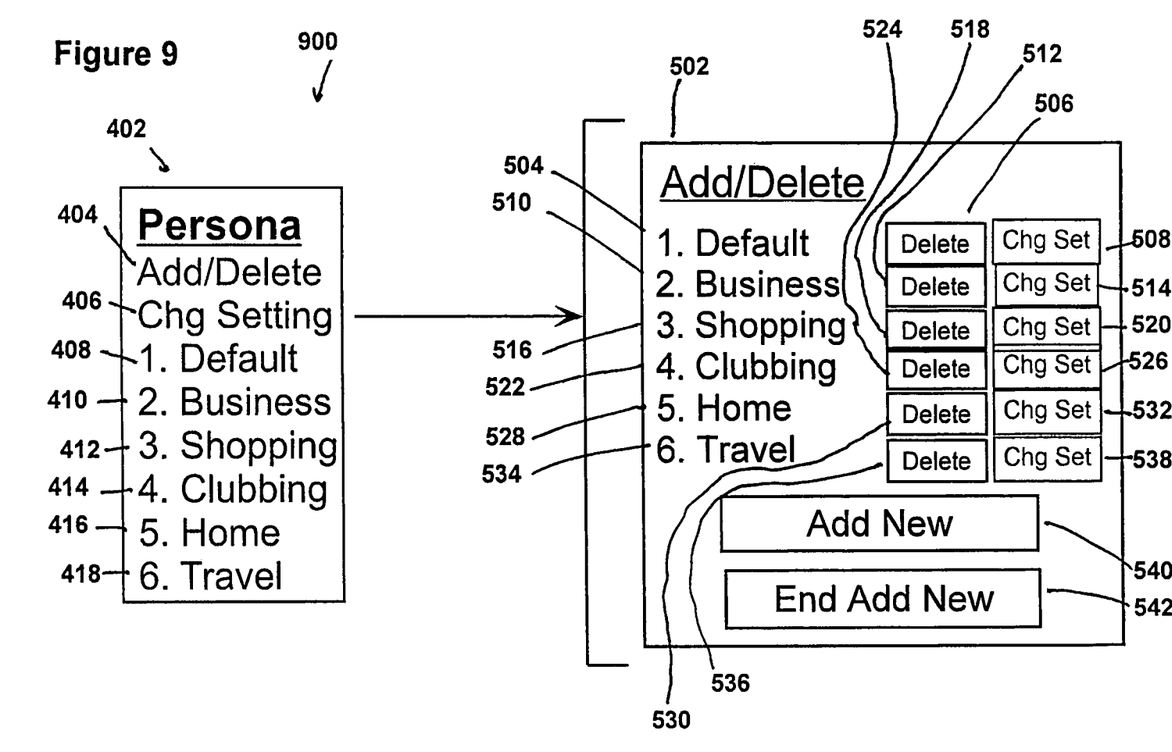
FIG. 9 shows the "Add/Delete" screen display that will be displayed when the "Chg Setting" selection is selected on the "Persona" menu.

Referring to FIG. 9, generally at 900, when "Chg Setting" selection 406 is selected on Persona drop-down menu 402, "Add/Delete" drop-down menu 502 is displayed on the display screen of MED 106. Add/Delete drop-down menu 502 displays "Default" 504 along with associated Delete button 506 and Chg Set button 508, "Business" 510 along with associated Delete button 512 and Chg Set button 514, "Shopping" 516 along with associated Delete button 518 and Chg Set button 520, "Clubbing" 522 along with associated Delete button 524 and Chg Set button 526, "Home" 528 along with associated Delete button 530 and Chg Set button 532, and "Travel" 534 along with associated Delete button 536 and Chg Set button 538. As stated previously, "Delete" button that is associated with each of the personas shown at 504, 510, 516, 522, 528, and 534 would be selected if the system user desired to delete that persona from the system and further use. This would cause that persona to be deleted from MED 106 and from system date database 112.

Figure 10:
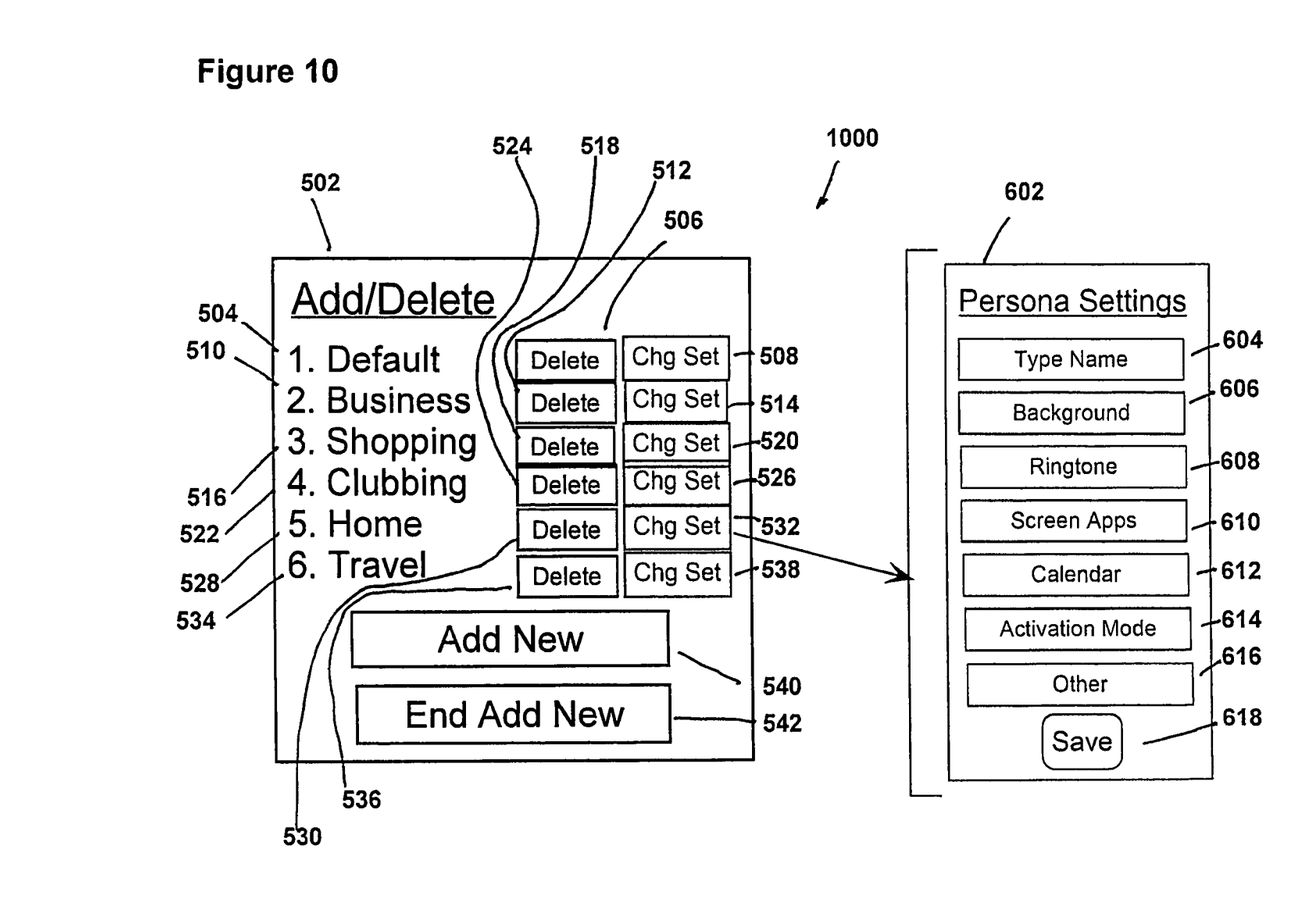
FIG. 10 shows the "Persona Settings" menu that will be displayed when the "Chg Set" icon is selected for one of the personas on the "Add/Delete" screen display.

Referring to FIGS. 9 and 10, changing persona settings will be described. Referring to FIG. 10, generally at 1000, if "Chg Set" button 532 for "Home" persona 528 is activated, it will cause "Person Settings" drop-down menu 602 to be displayed on MED 106. The system user will then enter any new change information into the settings for the Home persona and then activate the "Save" button at 618 that saves the new settings on MED 106 and system database 112. After this, the "Home" persona, when activated, will use the new settings.

Figure 11:
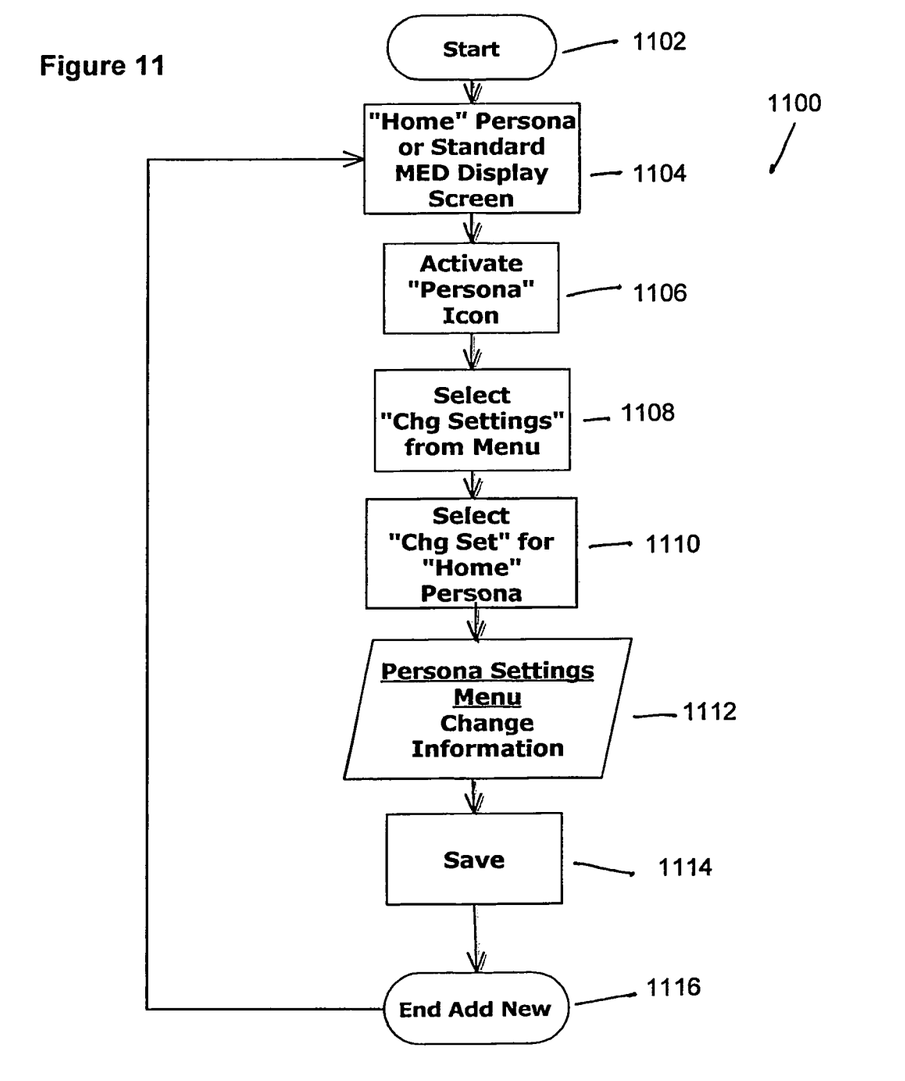
FIG. 11 shows a representative flow diagram for changing the setting for a persona on the MED according to the system and method of the present invention.

Referring to FIG. 11, generally shown at 1100, a flow diagram is shown for changing the settings for an existing persona. Start at 1102 of the flow diagram is when the system user desires to change the settings for an existing persona, for example the "Home" persona settings. At 1104, the system user will access the "Home" persona display screen or if the system user is in the standard mode of operation, the MED display screen. At 1106, the system user will activate the "Persona" icon. After this, at 1108, the system user will select the "Chg Settings" button from the drop-down menu. Then, at 1110, from the next drop-down menu, the system user will select the "Chg Set" button that is associated with the "Home" persona. At 1112, this selection will produce the "Persona Settings" menu and the system user will make the desired changes to the settings for the Home persona. Once these changes have been made, at 1114 system user will save these changes on the MED and in systems database 112. The system user will now activate the "End Add New" button which will return system user to the "Home" persona display screen or the standard MED display screen.

It is also contemplated that the system of the present invention may be carried out without the use of the system server 110 and database 112 (FIG. 1). I this embodiment of the present invention, the persona application of the present invention would be downloaded, for example, from an Internet website and stored on a MED, such as 102, 104, or 106 (FIG. 1). The system user would then create as many personas as desired in the method described above but instead of storing them on the system database, they would be stored in the MED memory. In this embodiment, there would be no need for account numbers because the persona information is stored locally on the MED. Other than these differences, the system and method of the present invention would be carried out as described above.

Is to be noted that when the system user activates the Save button in the described embodiments of the present invention, it will clear to display screen of MED 106 of any drop-down menus that may have been placed on the screen and process of adding new personas or changing personas.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components.

Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present invention is not intended to be limited to the embodiments shown or described herein.

The invention claimed is:

1. A system for configuring the mobile communications device to match a persona a system user desires to portray to third parties, comprising:

a system server that wirelessly connects to the at least one or more system user mobile communications devices, with the system server including at least a central processor, memory, and input/output subsystems for processing persona information and instructions from the system user mobile communications device and processing persona information retrieved from a system database for communication to each of the one or more system user mobile communications devices;

the system database that electronically connected to the system server for storing account information associated with the one or more system users with the account information including at least an account number for the system users and information for at least a plurality of personas created and stored by each of the one or more system users on the system database; and the system user mobile communications device that wirelessly connects to the system server, with each or the one or more system user mobile communications devices being capable of creating personas for operating the system user mobile communications devices to match a persona the system user desires to portray to third parties, changing and deleting personas that have been created, wirelessly transmitting persona information and instructions to the system server for storing system user account information of the system database that includes persona information created by the system user mobile communications device, wirelessly transmitting instructions to the system server for retrieving persona information stored on the system database to match a persona the system user desires to portray to third parties;

wherein creating personas includes downloading from a remote location a persona application, activating the downloaded persona application, activating an ADD icon, and inputting at least a persona name, background screen selection, ring tone selection, icons links for display on a background screen for accessing mobile applications, selecting an activation mode, and saving the created persona information on the system database associated with an account number; and wherein changing a created persona includes selecting a persona that has been created and respectively retrieving with each of the one or more system user mobile communications devices information settings for the selected persona from the system database location associated with the account number for each of the one or more system user mobile communications devices, accessing the desired category of information to be changed and changing such information and saving the changed information with the persona in the system database location associated with the account number for the system user mobile communications device.

2. The system as recited in claim 1, wherein the system user mobile communications device includes a smart mobile cellular device, a mobile smart tablet device, a smart wrist cellular communications device, or a personal digital assistant.

3. The system as recited in claim 2, wherein wireless connection between the system server and the system user mobile communications device includes a wireless connection via the Internet or the World Wide Web.

4. The system as recited in claim 2, wherein connection between the system server and the system database includes wired or wireless connections.

5. The system as recited in claim 1, wherein the system user mobile communications device includes input/output subsystems for wirelessly communicating electronic resources for providing information for creating and changing persona information.

6. A method for configuring a system user mobile communications device to match a persona a system user desires to portray to third parties, comprising the steps of:
   (a) activating a persona icon of a user interface display of the system user mobile communications device and displaying a list of personas the system user has created and stored in system memory;
   (b) selecting from the list a persona to match a persona the system user desires to portray to third parties;
   (c) activating the persona selected at step (b) and changing at least a background of the user interface display, a ringtone, and screen applications displayed on the user interface display according to information stored in memory for the selected persona;
   wherein creating a persona includes downloading from a remote location a persona application, activating the downloaded persona application, activating an ADD icon, and inputting at least a persona name, background screen selection, ringtone selection, icons links for display on a background screen for accessing mobile applications, selecting an activation mode, and saving the created persona information on the system database associated with an account number; and
   wherein changing a created persona includes selecting a persona that has been created and retrieving with a system user mobile communications device information settings for the selected persona from the system database location associated with the account number for the system user mobile communications device, accessing the desired category of information to be changed and changing such information and saving the changed information with the persona in the system database location associated with the account number for the system user mobile communications device.

7. The method as recited in claim 6, wherein the system user mobile communications device includes a smart mobile cellular device, a mobile smart tablet device, a smart wrist cellular communications device, or a personal digital assistant.

8. A The method as recited in claim 6, wherein the method further includes
   (a) automatically activating a persona for configuring the system user to match a persona a system user desires to portray to third parties; and
   (b) changing at least a background of the user interface display, a ringtone, and screen applications displayed on a user interface display according to information stored in memory for the automatically activated persona.

9. The method as recited in claim 8, wherein the system user mobile communications device includes a smart mobile cellular device, a mobile smart tablet device, a smart wrist cellular communications device, or a personal digital assistant.

10. The method as recited in claim 9, wherein automatically activating the persona includes automatic activating according to a predetermined location, or predetermined data or a predetermined time/date, or automatic electronic activation by the system user mobile communication device being exposed to a predetermined electronic field.

* * * * *